Jan. 19, 1960   R. J. WILLIAMS ET AL   2,921,621
VERTICALLY AND HORIZONTALLY ADJUSTED SEAT FRAME
Filed Aug. 1, 1952   6 Sheets-Sheet 4
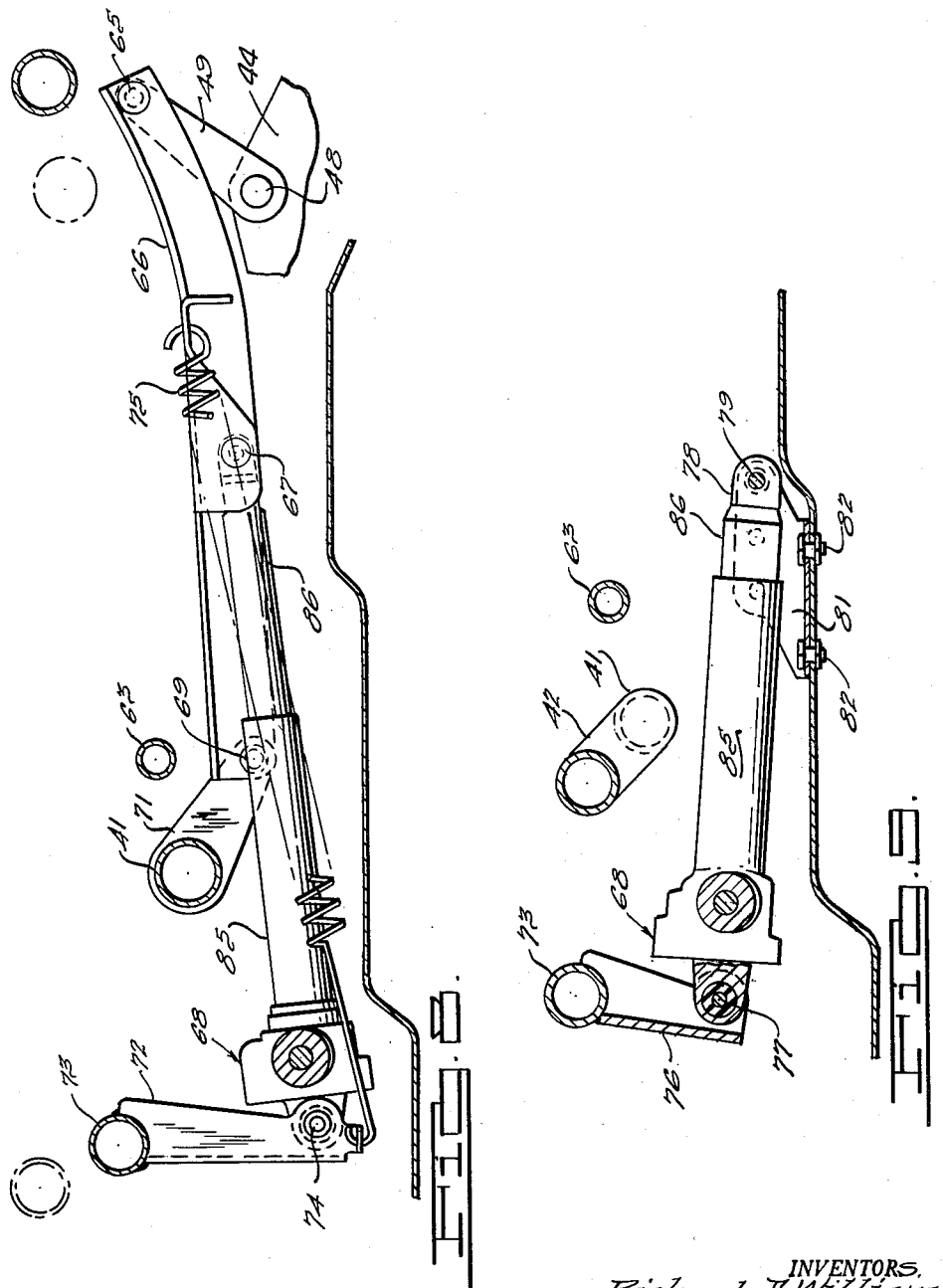
INVENTORS.
Richard J. Williams
Russell G. Heyl, Jr.
BY
Harness, Dickey & Pierce
ATTORNEYS.

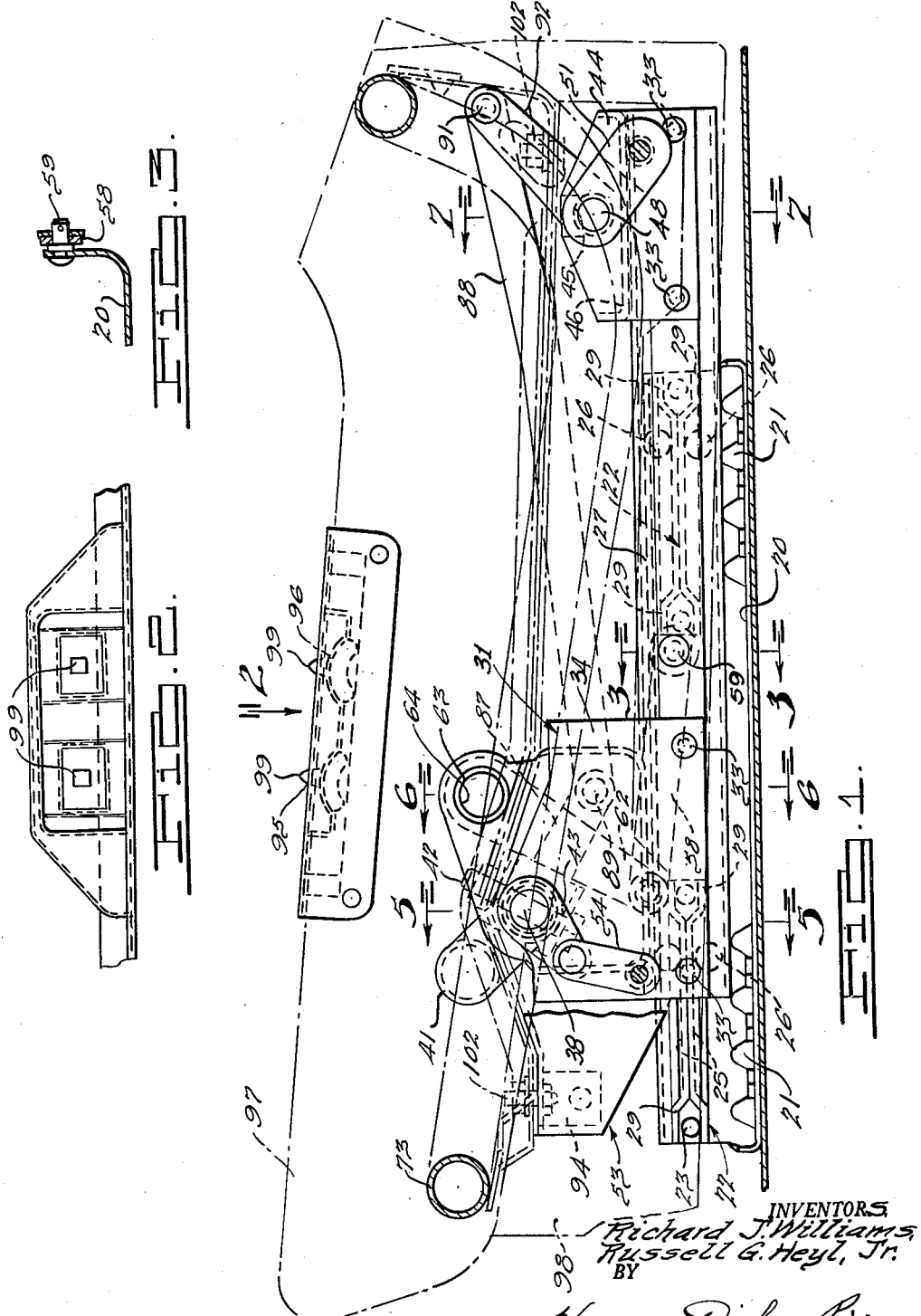

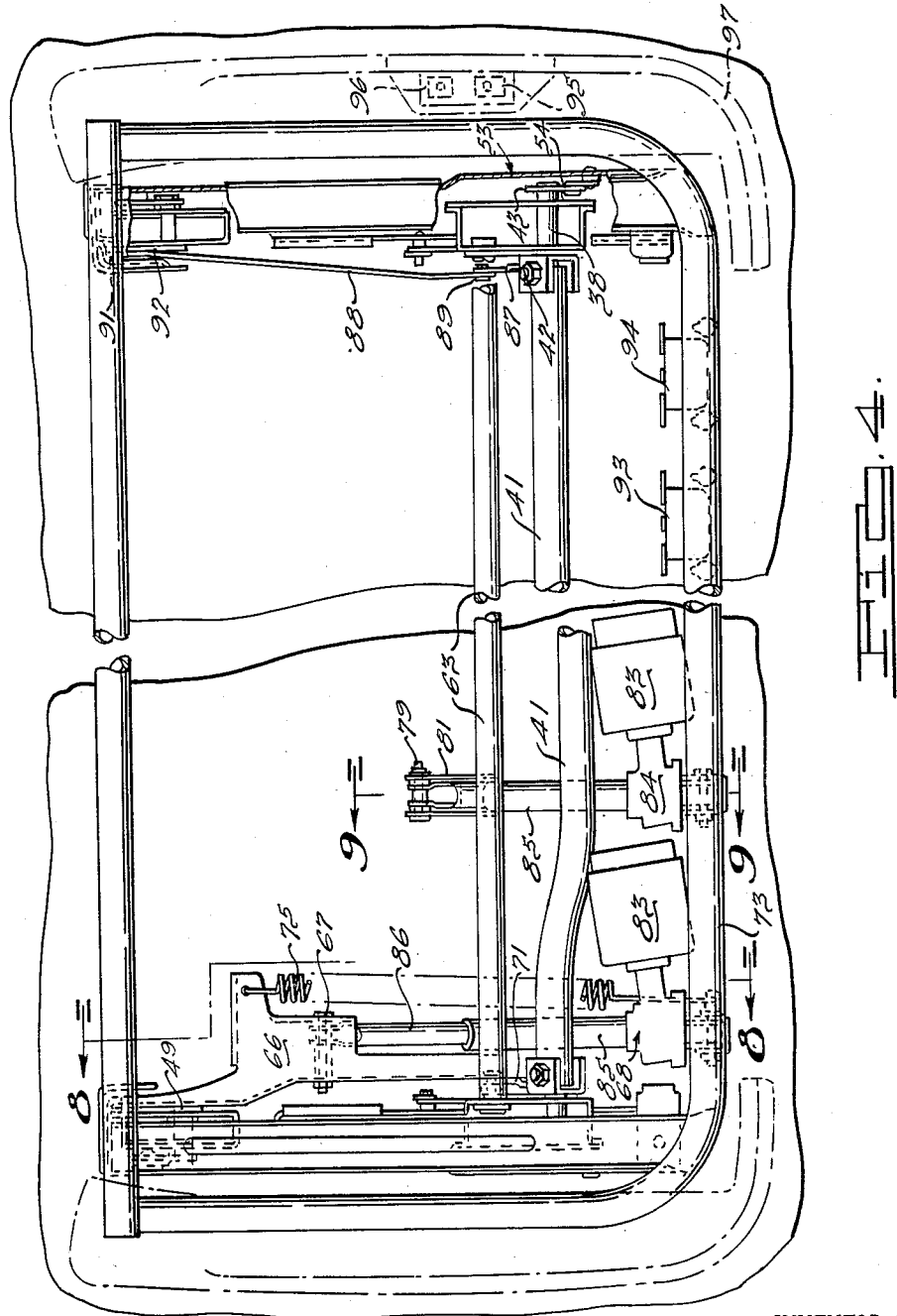

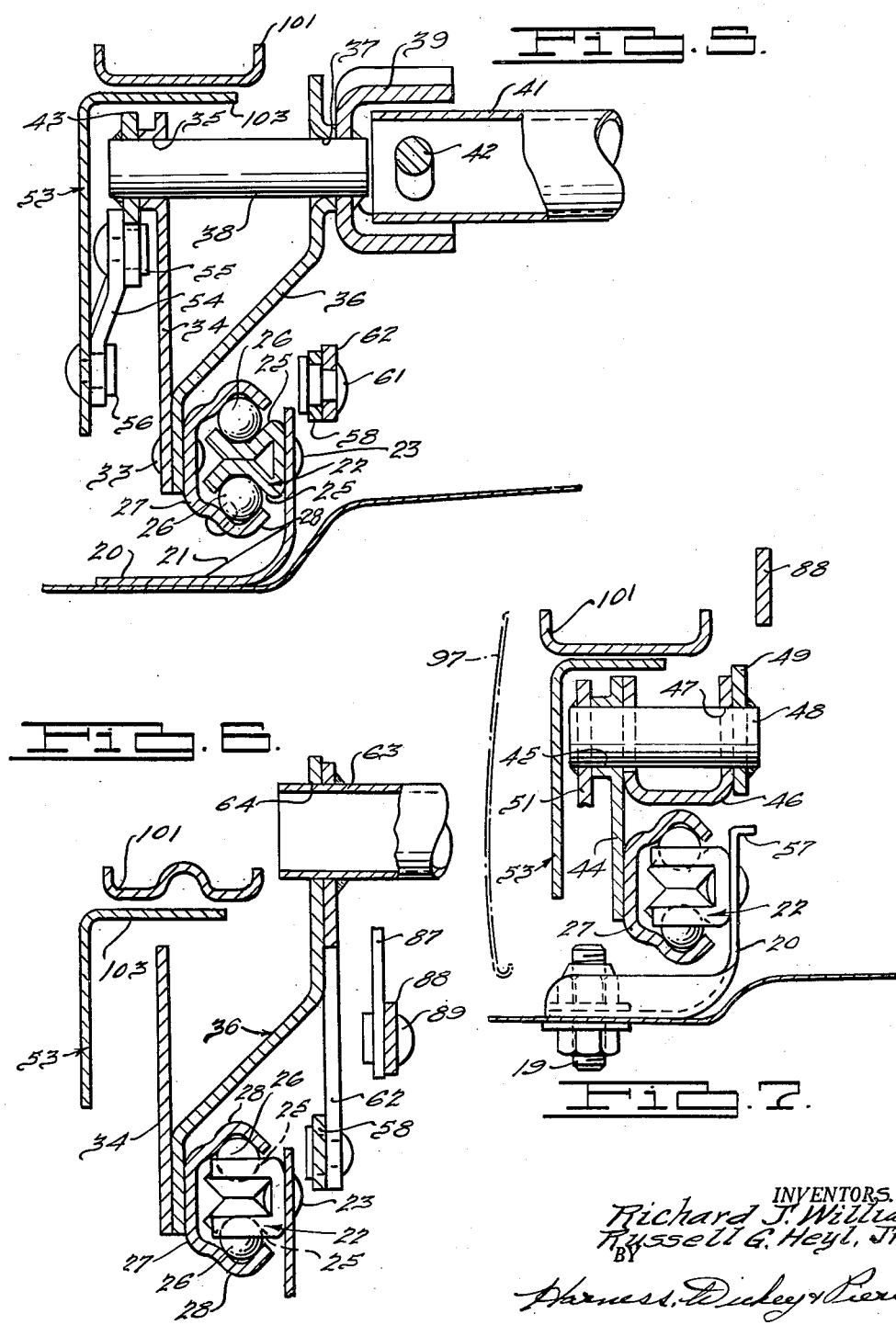

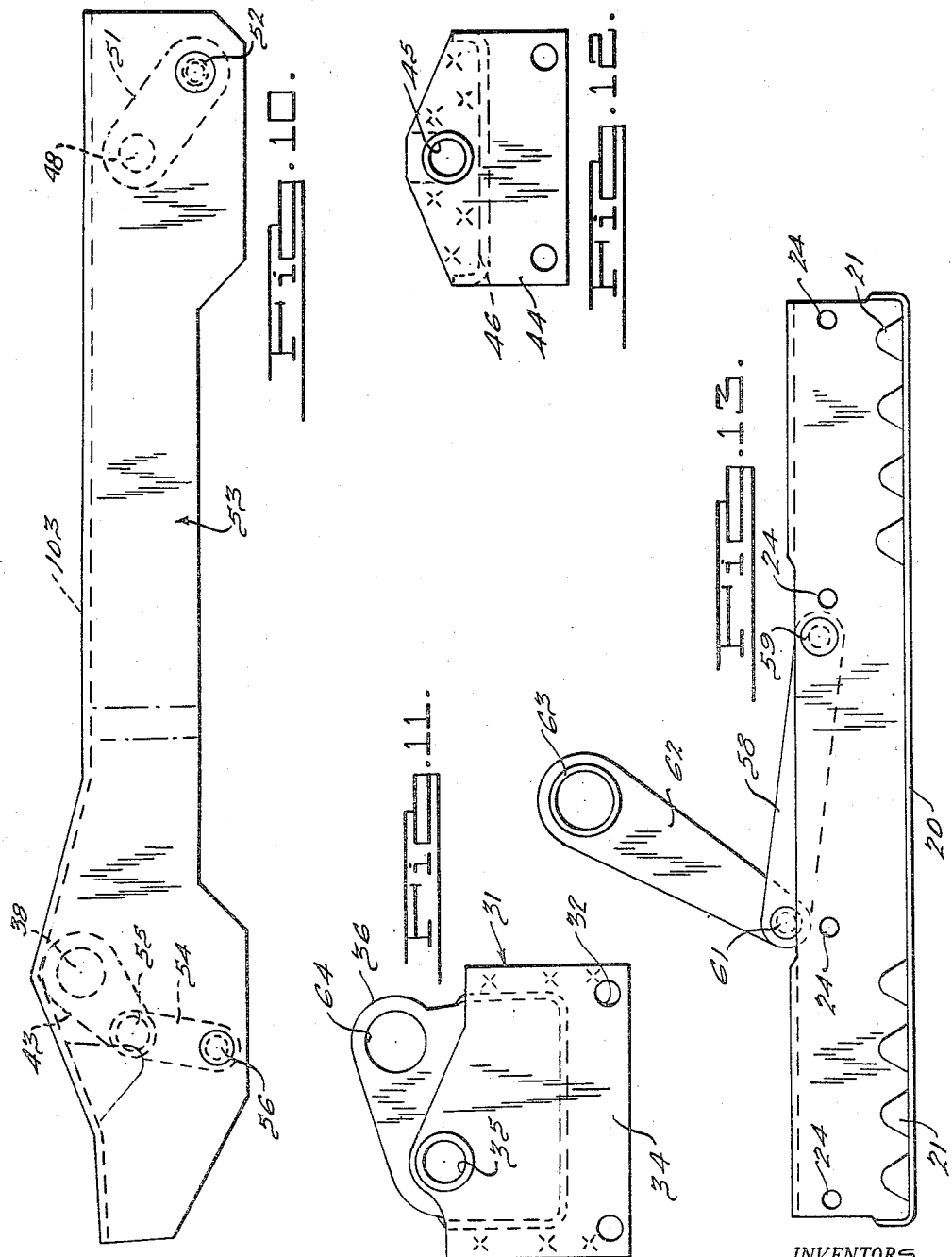

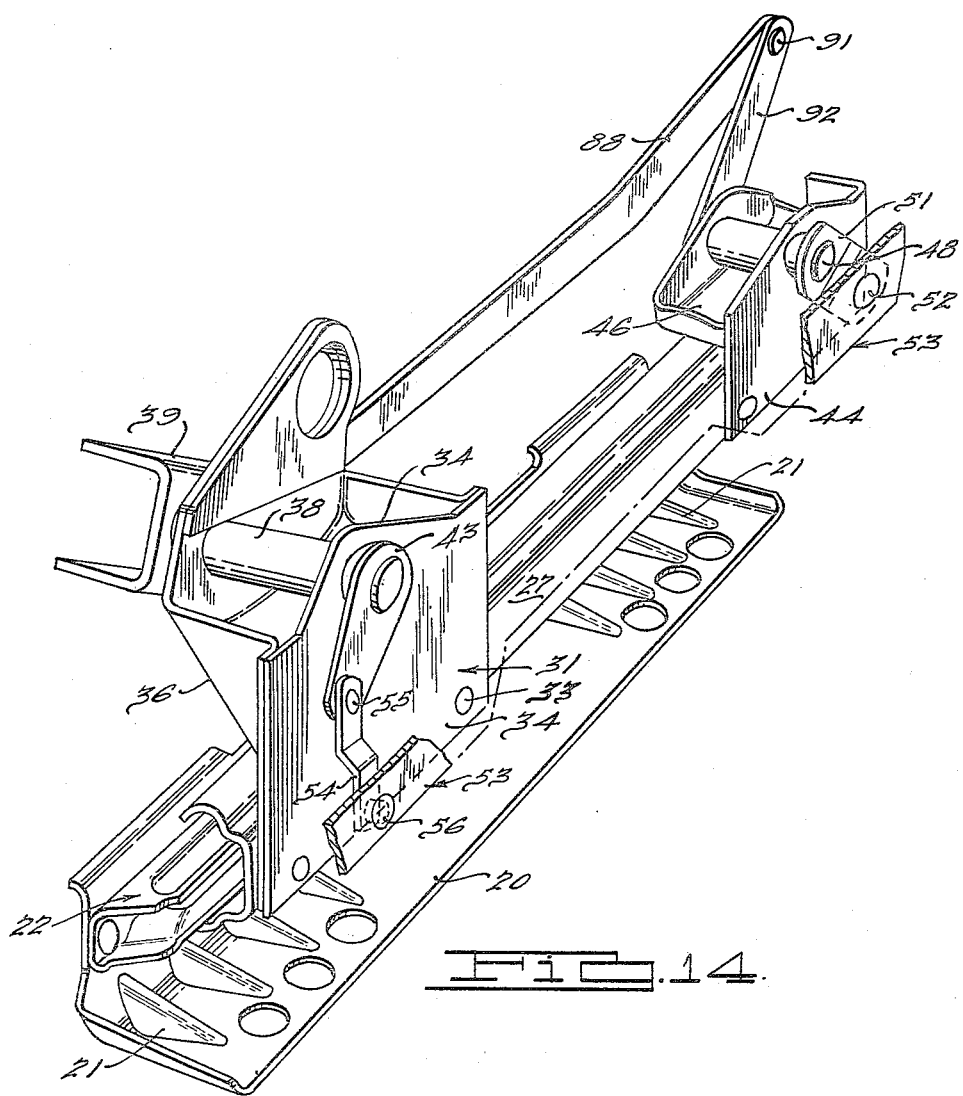

United States Patent Office 2,921,621
Patented Jan. 19, 1960

2,921,621

VERTICALLY AND HORIZONTALLY ADJUSTED SEAT FRAME

Richard J. Williams and Russell G. Heyl, Jr., Birmingham, Mich., assignors to American Metal Products Company, Detroit, Mich., a corporation of Michigan Application August 1, 1952, Serial No. 302,044

7 Claims. (Cl. 155—14)

This invention relates to seat supports of the vertically and horizontally adjustable type, and particularly to a seat support which is adjustable by power means in both vertical and horizontal directions.

In the copending application of Alfred H. Haberstump, Serial No. 176,593, filed July 29, 1950, which matured September 2, 1952, into Patent 2,609,029, and assigned to the assignee of the present invention, a seat support is illustrated which is shiftable horizontally and adjustable at the front and rear ends independently in a vertical direction. The adjustment is made by the release of a latch lever which permits the occupant by movement of the body to adjust the front or rear edge of the seat vertically, after which the release of the lever latches the seat in adjusted raised and/or tilted position. By releasing a second lever, the seat support may be adjusted forwardly and rearwardly, after which the release of the lever latches the support in horizontal adjusted position.

The present invention employs similar structure, modified so that the movement of the seat horizontally and vertically is controlled by motor driven mechanisms which move the seat forwardly and rearwardly when a switch button is moved to one or another position for the horizontal adjustment and for raising the seat at both the front and rear edges simultaneously the same or disproportionate amounts when the button of another switch is moved in either the forward or rearward direction.

Accordingly, the main objects of the invention are: to provide a seat support with operating means driven by a motor which raises the front and rear edge of the seat simultaneously the same or disproportionate amounts and moves the seat forwardly and rearwardly to different positions; to provide a base member attachable to the floor of a vehicle having a supporting track thereon carrying a track member having an intermediate supporting member thereon on which vertically adjustable mechanism is supported, attached to a seat supporting member; to provide a track member on a floor of a vehicle upon which a mating member is supported for horizontal adjustment and on which a vertical adjustable mechanism is carried and operated by a motor driven device for adjusting a seat supporting member in a vertical direction while retained for horizontal movement on the track member; to provide swingable arms of different lengths for raising and lowering a seat support which are operated by a motor driven device for simultaneously raising the front and rear edges of the seat disproportionate amounts to cause a desired amount of tilting to occur thereto during the change in the vertical position thereof, and, in general, to provide a seat which is adjustable horizontally and vertically by motor driven means which is simple in construction, positive of operation and economical of manufacture.

Other objects and features of novelty of the invention will be specifically pointed out or will become apparent when referring, for a better understanding of the invention, to the following description taken in conjunction with the accompanying drawings, wherein:

Figure 1 is a view in side elevation of a seat supporting mechanism embodying features of the present invention;

Fig. 2 is a broken plan view of the structure illustrated in Fig. 1, as viewed from the arrow 2 thereof;

Fig. 3 is a sectional view of the structure illustrated in Fig. 1, taken on the line 3—3 thereof;

Fig. 4 is a broken plan view of the structure illustrated in Fig. 1;

Fig. 5 is an enlarged sectional view of the structure illustrated in Fig. 1, taken on the line 5—5 thereof;

Fig. 6 is an enlarged sectional view of the structure illustrated in Fig. 1, taken on the line 6—6 thereof;

Fig. 7 is an enlarged sectional view of the structure illustrated in Fig. 1, taken on the line 7—7 thereof;

Fig. 8 is an enlarged sectional view of the structure illustrated in Fig. 4, taken on the line 8—8 thereof;

Fig. 9 is an enlarged sectional view of the structure illustrated in Fig. 4, taken on the line 9—9 thereof;

Figs. 10, 11, 12 and 13 are views of the separate elements which are embodied in the structure as illustrated in Fig. 1, and Fig. 14 is a perspective view of the seat supporting mechanism illustrated in Fig. 1, with parts broken away.

The seat support of the present invention comprises a pair of space supporting mechanisms each embodying a floor engaging base member 20 of angle section, as illustrated in Figs. 3, 5 and 7, having spaced reinforced embossed nibs 21 to provide strength on the opposite side of apertures through which securing bolts extend. The base member has individual track members 22 secured thereto by rivets 23 extending through apertures 24 in the vertical web thereof. The track member 22 has oppositely disposed channel portions 25 for receiving a pair of balls 26 which are encompassed by a channel shaped track member 27 having oppositely disposed channel portions 28 at the top and bottom thereof which engage the balls. The portions forming the channels 25 are flanged outwardly at the ends at 29 for limiting the movement of the balls when shifted on the track members. The track member 27 has a bracket 31 near the forward end secured thereto by rivets 33 extending through apertures 32 in the member. The bracket is made up of an outer flat plate 34 having a flanged opening 35 at the upper end, and having welded at its marginal edge a plate 36 having an embossed central portion which is spaced from the plate 34 and provided with a flanged opening 37. A shaft 38 extends through the aligned flanged openings 35 and 37 providing spaced supports therefor. One end of the shaft 38 is welded to a U-shaped element 39 to which a torque bar 41 is secured by a bolt 42. The outer or opposite end of the shaft 38 is secured to an arm 43 which is welded or otherwise secured thereto. The rotation of the torque bar 41 rotates the shaft 38 and actuates the arm 43 of the right and left hand mechanism at the sides of the seat support. It is to be understood that the same elements provided on the left hand mechanism are present on the right hand mechanism, with the exception that the elements are of the opposite hand.

The rear end of the track member 27 has a plate 44 secured thereto by rivets 33 in apertures 32 thereof, and, as illustrated in Fig. 12, has a flanged opening 45 provided in the upper portion thereof. A U-shaped member 46 is welded to the plate 44, having an aperture 47 therein aligned with the flanged aperture 45. The apertures 45 and 47 support a shaft 48 for rotation, the inner end of which is secured to an arm 49, as by welding, the outer end having an arm 51 welded thereto. The arm 51 is secured by a pivot 52 to a seat supporting member 53. Similarly, the arm 43 is secured to a link 54 by a pivot 55, with the opposite end of the link 54 secured to the seat supporting member 53 by a pivot 56.

The base member 20 has inwardly projecting flanges 57 at each end to provide strength thereto, and rearwardly of the central portion has a link 58 secured thereto by a pivot 59. The opposite end of the link 58 is secured by a pivot 61 to an arm 62 which is attached to a torsion bar 63 supported in a second aperture 64 in the plate members 36. The arms 62 secured near the ends of the torsion bar 63 and connected to the link 58 cause the simultaneous horizontal adjustment of the right and left-hand track members 27 when moved to a forward or rearward position.

The arm 49 on the shaft 48 is secured by a pivot 65 to a formed link 66 which is secured by a pivot 67 to a motor driven operating mechanism 68. The opposite end of the link 66 is secured by a pivot 69 to an arm 71 which is attached to the torsion bar 41. A bracket 72 extends downwardly from the tubular frame 73 of the seat and is welded thereto to form the means for securing the operating mechanism 68 on a pivot 74 carried thereby. A spring 75 has one end hooked to the bracket 72 and the opposite end hooked to the link 66 to provide tension therebetween to eliminate play in the pivoted parts of the mechanism.

A bracket 76 extends downwardly from the seat frame 73, being welded or otherwise rigidly attached thereto, so as to support a pivot 77 for securing the rear end of the operating mechanism 68 for moving the seat forwardly and rearwardly. The opposite end of the mechanism 78 is secured by a pivot 79 to a bracket 81 which is rigidly attached to the floor of the vehicle by bolts 82, as illustrated more specifically in Fig. 9. In this figure it will be noted that the torsion bar 41 has an off-set crank portion 42 between its ends for clearing the tunnel provided in the floor of the vehicle body for the propeller housing.

The operating mechanism 68 is of the standard type embodying a motor 83 having the shaft thereof projecting into a housing 84 containing bevel gears which operate a lead screw in the sleeve 85 which rotates within a sleeve 86 for extending or retracting the sleeve 86 relative to the sleeve 85. Through the relative extension or retraction of the sleeves, longitudinal movement of the link 66 occurs for revolving the arms 49 and 71 and thereby actuating the arms 43 and 51, which causes the arm 51 to revolve upwardly in a counterclockwise direction, carrying the pin 52 upwardly therewith, the link 54 being revolved in a clockwise direction carrying the pivot 55 upwardly therewith, which upward movement of the pivots raises the seat supporting member 53. The arm 51 being longer than the arm 43 causes the rear end of the member 53 to move upwardly a greater distance than the front end, thereby tilting the back of the seat forwardly. By having the link 43 connected to the supporting member 53 through the link 54, the arms are free to revolve in the opposite direction. An arm 87 is also attached to the torsion bar 41 on the opposite end thereof from the arm 71, having a link 88 secured thereto by a pivot 89, the opposite end of the link 88 being secured by a pivot 91 to an arm 92 which is pivoted to the shaft 48 at the left-hand side of the seat.

Relays 93 and 94 are secured to the frame member 73 connected by circuits to the motors 83 and to a pair of switches 95 and 96 mounted on the left-hand side of the frame on the trim plate 97 provided thereon. The trim plate cooperates with the bottom trim member 98 which is secured to the frame member 73 to enclose the seat support and the lower portion of the seat. The switches are provided with an operating button 99 which, on the switch 95, when moved forwardly, operates the motor 83 through the relay 94 to move the seat forwardly, and when moved rearwardly operates the motor through the relay 94 to move the seat rearwardly. The seat is retained in adjusted position when the button is in the central position. Similarly, when the button 99 of the switch 96 is moved forwardly, the motor 83 operates through the relay 93 to raise the seat. When the button is moved rearwardly, the motor is reversed through the relay 93 to lower the seat, the seat being retained in any of its adjusted positions when the button is in the intermediate or central position.

The tubular frame member 73 of the seat is secured to a channel member 101 which is attached by bolts 102 to the top flange 103 of the supporting member 53. The base members 20 are secured to the floor by a plurality of bolts 19. It will thus be seen that the entire seating mechanism is supported on the track members 27 which are adjustable forwardly and rearwardly upon the track members 22. The adjusting mechanisms are mounted on the brackets 31 and 44 at the front and rear of each member 27 being so constructed as to provide outboard support for the shafts 38 and 48 mounted thereon. The shaft 38 of the bracket 31 is secured to a torsion bar 41, while the plate portion 36 thereof supports the torsion bar 63. The torsion bar 41 produces the simultaneous movement of the raising mechanism, while the torsion bar 63 produces the simultaneous forward and rear movement of the seat on the track members at opposite sides thereof.

By manipulating the button 99 of the switch 95, the entire seat and track members 27 are moved forwardly and rearwardly on the track members 22, and by operating the button 99 of the switch 96, the torsion bar 41 is rotated to raise and lower the seat supporting member 53, and therefore the seat which is tilted forwardly due to the greater length of the link 51 than the link 43. The operating mechanism for raising the seat is mounted on the right-hand side thereof, the link for rotating the torsion bar 41 operating the arm 49 and rotating the shaft 48 at the rear of the track member 27 on the right-hand side of the seat. The arm 87 on the torsion bar 41 at the left-hand side of the seat actuates the link 88 to operate an arm 91 on the shaft 48 so that both of the raising mechanisms on the right and left-hand side of the seat operate simultaneously. The torsion bar 41 is of large diameter to prevent any twisting thereof when the weight of the occupants is applied thereto. While a link 54 is employed for permitting the free swinging of the arms 43 and 51, it is to be understood that any other device, such as a pivot operating in a slot may be utilized for producing a lost motion connection between the arm and the seat supporting member.

What is claimed is:

1. In a seat supporting mechanism, a base member having substantially longitudinal relatively movable track members, a pair of brackets supported on one of said track members at opposite ends thereof, a shaft supported by the bracket at the forward end of said one track member, a shaft supported by the bracket at the rear of said one track member, arms secured to said shafts, a seat supporting member, pivot means for securing said seat supporting member to the opposite end of the arms from that secured to the shafts, additional arms extending from said shafts, a link interconnecting said additional arms for causing said shafts to operate simultaneously, a second seat supporting mechanism similar to said first seat supporting mechanism but of the opposite hand spaced therefrom in position to have a seat supported thereacross, a torsion bar interconnecting the shafts supported by the forward brackets, an operating mechanism having one end connected to the link interconnecting said arms for operating the shafts simultaneously, and pivot means supporting the other end of said operating mechanism so that the mechanism may tilt as the said seat is raised and lowered.

2. In a seat supporting mechanism, a base member having substantially longitudinal relatively movable track members, a pair of brackets supported on one of said track members at opposite ends thereof, a shaft supported by the bracket at the forward end of said one track member, a shaft supported by the bracket at the rear of said one track member, arms secured to said shafts, a seat supporting member, pivot means for securing said seat supporting member to the opposite end of the arms from that secured to the shafts, additional arms extending from said shafts, a link interconnecting said additional arms for causing said shafts to operate simultaneously, a second seat supporting mechanism similar to said first seat supporting mechanism but of the opposite hand spaced therefrom, a seat frame supported by said mechanisms, a torsion bar interconnecting the shafts supported by the forward brackets, an operating mechanism connected to the link interconnecting said arms on said first supporting mechanism for operating the shafts on both seat supporting mechanisms simultaneously, a second torsion bar supported by said brackets, arms extending downwardly from the ends of said second torsion bar, links pivoted to said last arms and to said base member, a second operating mechanism, a fixed bracket, and means pivotally securing the second mechanism to the seat frame and said bracket whereby when the mechanism is extended the seat is moved forwardly equal amounts on both sides due to the presence of the second torsion bar having the arms attached to links which are pivoted to the base members.

3. In a seat supporting mechanism, a base member having substantially longitudinal relatively movable track members, a pair of brackets supported on one of said track members at opposite ends thereof, a shaft supported by the bracket at the forward end of said one track member, a shaft supported by the bracket at the rear of said one track member, arms secured to said shafts, a seat supporting member, pivot means for securing said seat supporting member to the opposite end of the arms from that secured to the shafts, additional arms extending from said shafts, a link interconnecting said additional arms for causing said shafts to operate simultaneously, a second seat supporting mechanism similar to said first seat supporting mechanism but of the opposite hand spaced therefrom, a seat frame supported by said mechanisms, a torsion bar interconnecting the shafts supported by the forward brackets, an operating mechanism connected to the link interconnecting said arms on said first supporting mechanism for operating the shafts on both seat supporting mechanisms simultaneously, a second torsion bar supported by said brackets, arms extending downwardly from the ends of said second torsion bars, links pivoted to said last arms and to said base member, a second operating mechanism, a fixed bracket, and means pivotally securing the second mechanism to the seat frame and said bracket whereby when the mechanism is extended the seat is moved forwardly equal amounts on both sides due to the presence of the second torsion bar having the arms attached to links which are pivoted to the base members, said first torsion bar connecting the shafts of the forward brackets having an offset cranklike portion therein which moves horizontally during the vertical movement of the seat supporting members.

4. In a seat supporting mechanism, a base member having substantially longitudinal relatively movable track members, a pair of brackets supported on one of said track members at opposite ends thereof, a shaft supported by the bracket at the forward end of said one track member, a shaft supported by the bracket at the rear of said one track member, arms secured to said shafts, a seat supporting member, pivot means for securing said seat supporting member to the opposite end of the arms from that secured to the shafts, additional arms extending from said shafts, a link interconnecting said additional arms for causing said shafts to operate simultaneously, a second seat supporting mechanism similar to said first seat supporting mechanism but of the opposite hand spaced therefrom, a seat frame supported by said mechanisms, a torsion bar interconnecting the shafts supported by the forward brackets, an operating mechanism connected to the link interconnecting said arms on said first supporting mechanism for operating the shafts on both seat supporting mechanisms simultaneously, a second torsion bar supported by said brackets, arms extending downwardly from the ends of said second torsion bars, links pivoted to said last arms and to said base member, a second operating mechanism, a fixed bracket, and means pivotally securing the second mechanism to the seat frame and said bracket whereby when the mechanism is extended the seat is moved forwardly equal amounts on both sides due to the presence of the second torsion bar having the arms attached to links which are pivoted to the base members, said first torsion bar connecting the shafts of the forward brackets having an offset cranklike portion therein which moves horizontally during the vertical movement of the seat supporting members, motors for driving said operating means, switch means, a circuit between the switch means and said motors, and relays in each of the circuits between said switch means and said motor means by which the motors are driven in forward or reverse direction for raising and lowering and for advancing and retracting the seat supporting member.

5. In a seat supporting mechanism, a pair of track members, each track member embodying a first, second and third element disposed in substantially parallel relation to each other, a rotatable torsion bar supported by one of said elements of each member adjacent to one end thereof, arms on the ends of said bar, an arm pivoted to each said element which supports the bar on the opposite ends thereof, pivot means connecting said arms to another of said elements of each track member, the pivot means at one end of the last said elements providing a lost motion connection of the arms therewith, means for securing said third element to one of said first and second elements for relative longitudinal movement therebetween, motor means carried by said mechanism for operating the arms between said first and second elements for producing a relative raising and lowering movement therebetween, and motor means carried by said mechanism for producing a relative forward and rearward movement between said third element and said one of said first and second elements.

6. In a seat supporting mechanism, a pair of track members, each track member embodying a first, second and third element disposed in substantially parallel relation to each other, a rotatable torsion bar supported by one of said elements of each member adjacent to one end thereof, arms on the ends of said torsion bar in fixed relation thereto, an arm pivoted to each said element which supports the bar on the opposite ends thereof, pivot means connecting said arms to another of said elements of each said track member, means for securing said third element to one of said first and second elements for longitudinal movement relative thereto, additional arms in fixed relation to said first arms in angular relation thereto, a link for each track member connecting the additional arms thereof, a motor driven extensible and retractable device carried by the mechanism for operating the torsion bar and the arms pivoted between said first and second elements for producing the relative raising and lowering movement therebetween, and a motor driven extensible and retractable device carried by the mechanism for producing a relative forward and rearward movement.

7. Horizontally and vertically adjustable seat supporting structure comprising a pair of generally horizontal tracks, a pair of elongated slides on said tracks, said slides including elevated posts adjacent the ends thereof, seat supporting arms pivoted to all of said posts, a pair of independently rotatable cross shafts extending between said slides and pivotally connected to corresponding posts thereon, one of said shafts being rigidly connected to a pair of said arms, the other of said shafts having a pair of equalizer arms rigidly connected thereto, and equalizer links pivotally connecting said last mentioned arms to said tracks.

References Cited in the file of this patent

UNITED STATES PATENTS

| | | |
|---|---|---|
| 1,664,129 | Pallenberg | Mar. 27, 1928 |
| 2,129,952 | Lustig | Sept. 13, 1938 |
| 2,149,946 | Whedon et al. | Mar. 7, 1939 |
| 2,195,507 | Best | Apr. 2, 1940 |
| 2,261,728 | Lawler | Nov. 4, 1941 |
| 2,568,930 | Parsons | Sept. 25, 1951 |
| 2,596,033 | King | May 6, 1952 |
| 2,609,029 | Haberstump | Sept. 2, 1952 |
| 2,630,159 | Fifield | Mar. 3, 1953 |
| 2,641,305 | Oishei | June 9, 1953 |